(12) United States Patent
Morgan

(10) Patent No.: US 6,596,043 B1
(45) Date of Patent: Jul. 22, 2003

(54) AIR/OIL SEPARATOR TANK WITH PERMANENT DRAIN LAYER

(75) Inventor: Jeffrey S. Morgan, Stoughton, WI (US)

(73) Assignee: Nelson Industries, Inc., Stoughton, WI (US)

( * ) Notice: Subject to any disclaimer, the term of this patent is extended or adjusted under 35 U.S.C. 154(b) by 0 days.

(21) Appl. No.: 09/981,112

(22) Filed: Oct. 17, 2001

(51) Int. Cl.$^7$ ............................................. B01D 25/02
(52) U.S. Cl. ............................. 55/318; 55/486; 55/490; 96/191; 210/315; 210/338
(58) Field of Search ................... 210/188, 194, 210/435, 483, 484, 497.01, DIG. 5; 96/155, 188, 189, 190, 191; 418/DIG. 1; 55/318, 319, 482, 486, 488, 490, 521, 522, 527

(56) References Cited

U.S. PATENT DOCUMENTS

| | | | |
|---|---|---|---|
| 3,955,945 A | * | 5/1976 | Bauer |
| 4,233,042 A | | 11/1980 | Tao ............................. 55/482 |
| 4,372,847 A | * | 2/1983 | Lewis ......................... 210/315 |
| 4,878,929 A | | 11/1989 | Tofsland et al. ............... 55/486 |
| 5,129,923 A | | 7/1992 | Hunter et al. .................. 55/486 |
| 5,480,547 A | | 1/1996 | Williamson et al. ......... 210/799 |
| 5,800,584 A | | 9/1998 | Hinderer et al. .............. 55/482 |
| 5,814,133 A | | 9/1998 | Hunter et al. ................. 55/319 |
| 5,961,678 A | | 10/1999 | Pruette et al. |
| 5,972,063 A | | 10/1999 | Dudrey et al. ................ 55/486 |
| 6,015,452 A | | 1/2000 | Nepsund et al. .............. 55/486 |
| 6,093,231 A | * | 7/2000 | Read et al. .................... 55/521 |
| 6,136,076 A | * | 10/2000 | Read ............................ 96/189 |
| 6,419,721 B1 | * | 7/2002 | Hunter |
| 6,485,535 B1 | * | 11/2002 | Linnersten et al. ........... 55/319 |

FOREIGN PATENT DOCUMENTS

JP  4-342894  * 11/1992  ............ 418/DIG. 1

* cited by examiner

Primary Examiner—Joseph Drodge
(74) Attorney, Agent, or Firm—Andrus, Sceales, Starke & Sawall, LLP

(57) ABSTRACT

An air/oil separator tank (10, 60) has a separator element (12, 62) including coalescing media (14, 64). A separate downstream drain layer (22, 72) removes the separated coalesced oil and passes clean air. The separator element is removable from the tank for replacement. The drain layer is permanently attached to the tank.

11 Claims, 1 Drawing Sheet

AIR/OIL SEPARATOR TANK WITH PERMANENT DRAIN LAYER

BACKGROUND AND SUMMARY OF THE INVENTION

The invention relates to air/oil separator tanks, and more particularly to a construction permitting a less expensive separator element.

Air/oil separator tanks are known in the prior art for separating oil from an oil laden air stream, for example to remove the fine mist of lubricating and cooling oil used in compressors. The separator element is typically made of several layers of media, including coalescing media, through which the air and oil mist must pass. The final layer of the element is the drain layer where the oil settles out of the element. The several layers of upstream media separate the fine oil mist from the oil laden compressed air, and the final layer of the element, namely the drain layer, removes the coalesced oil from the compressed air flow. The oil is gathered and recirculated through the compressor.

Air/oil separator elements are replaced at regular intervals because the coalescing media becomes dirty and clogged with contaminant and decreases the efficiency of the air compressor. The present invention provides a less expensive separator element, reducing cost, particularly where frequent changes of the separator element are necessary.

DETAILED DESCRIPTION OF THE INVENTION

Figure 1:
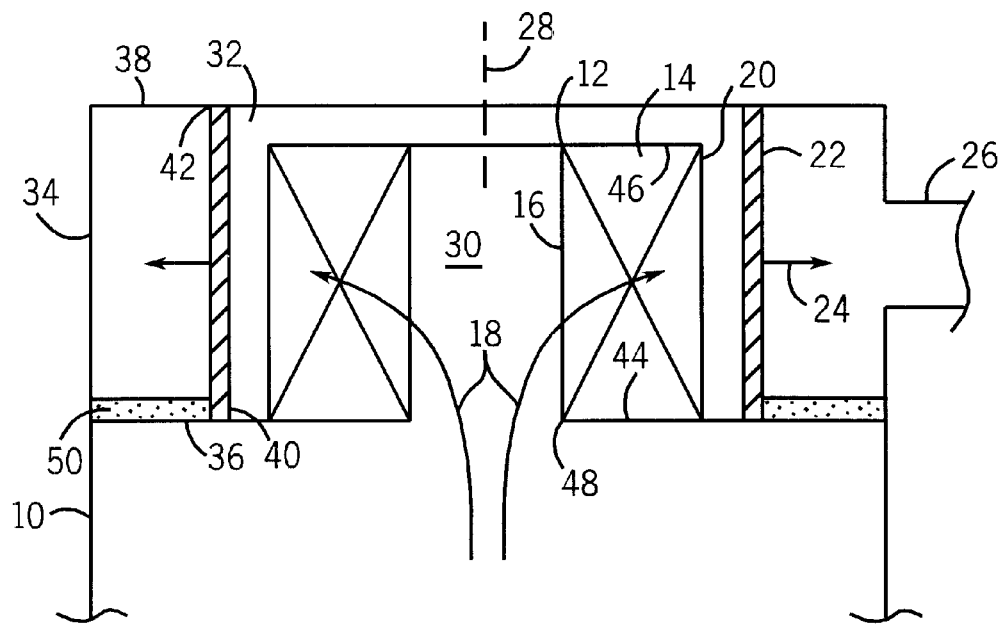
FIG. 1 is a schematic illustration of an air/oil separator tank in accordance with the invention.

FIG. 1 shows an air/oil separator tank 10 having a separator element 12 having a plurality of layers including coalescing media 14. Separator element 12 has an upstream side 16 receiving oil laden air as shown at arrows 18 from a compressor (not shown), and has a downstream side 20 passing separated coalesced oil and clean air therefrom. A drain layer 22 is permanently attached to the tank and is downstream of separator 12 and removes the separated coalesced oil and passes the clean air as shown at arrow 24 to outlet 26.

Separator element 12 is preferably annular and extends axially along an axis 28, and has an inner perimeter at 16 defining a hollow interior 30, and has an outer perimeter at 20 defining an annular outer chamber 32. Drain layer 22 is in outer chamber 32. Tank 10 has a sidewall 34 extending axially between distally opposite first and second endwalls 36 and 38. Drain layer 22 is spaced radially outwardly of separator element 12. Sidewall 34 is spaced radially outwardly of drain layer 22.

Drain layer 22 extends axially in outer chamber 32 between endwalls 36 and 38. Drain layer 22 has a first axial end 40 at endwall 36, and has a second axial end 42 at endwall 38. Separator element 12 extends axially between distally opposite first and second axial ends 44 and 46. Endwall 36 engages end 40 of drain layer 22 and end 44 of separator element 12. Endwall 36 has an opening 48 therethrough axially aligned with hollow interior 30. Oil laden air flows as shown at arrows 18 through opening 48 in endwall 36 axially into hollow interior 30 and then radially outwardly through separator element 12. Separator element 12 is removably mounted to tank 10 at the engagement of endwall 36 and end 44 of separator element 12. In one embodiment, drain layer 22 is permanently mounted to tank 10 at the engagement of endwall 36 and end 40 of drain layer 22. In another embodiment, drain layer 22 is permanently mounted to tank 10 at the engagement of endwall 38 and end 42 of drain layer 22. Endwall 38 may be axially spaced from end 46 of separator element 12, or may removably engage same. In one desirable embodiment, drain layer 22 is permanently and integrally attached to endwall 38, and the latter is provided as a tank cover or end cap removably mounted to the tank. Outer chamber 32 has an annular reservoir at 50 along endwall 36 between drain layer 22 and sidewall 34, and collecting separated coalesced oil, which may be recirculated to the compressor.

Figure 2:
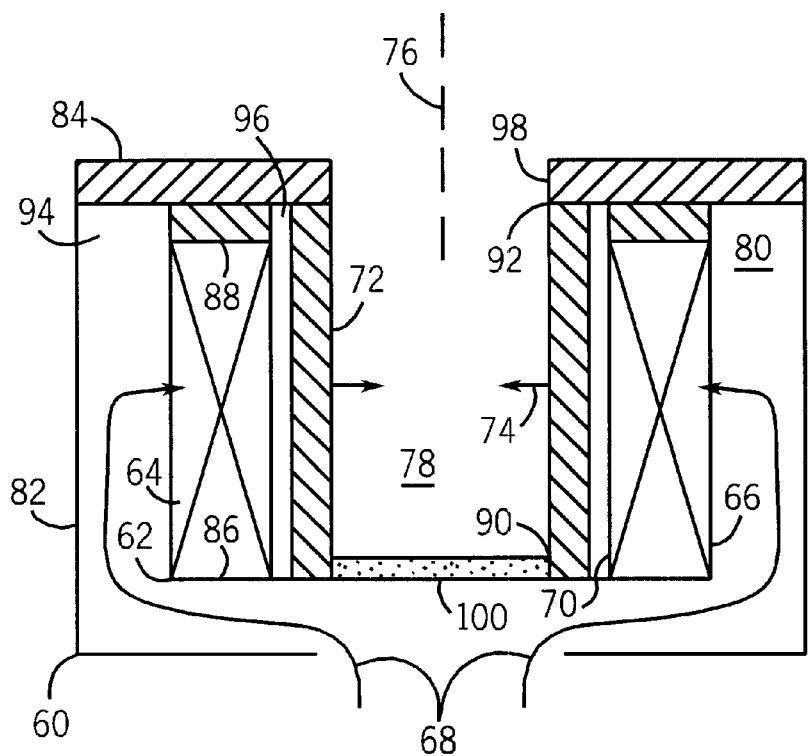
FIG. 2 is a schematic illustration of an alternate embodiment of an air/oil separator tank in accordance with the invention.

FIG. 2 illustrates another embodiment and shows an air/oil separator tank 60 having a separator element 62 having a plurality of layers including coalescing media 64. Separator element 62 is removable from the tank and has an upstream side 66 receiving oil laden air as shown at arrows 68 from a compressor (not shown), and having a downstream side 70 passing separated coalesced oil and clean air therefrom. A drain layer 72 is permanently attached to the tank and is downstream of separator element 62 and removes separated coalesced oil and passes the clean air as shown at arrows 74. Separator element 62 is preferably annular and extends axially along an axis 76, and has an inner perimeter at 70 defining a hollow interior 78, and has an outer perimeter at 66 defining an annular outer chamber 80. Drain layer 72 is in hollow interior 78. Tank 60 has a sidewall 82 extending axially from an endwall 84. Sidewall 82 is spaced radially outwardly of separator element 62. Separator element 62 extends axially between distally opposite first and second axial ends 86 and 88. Drain layer 72 extends axially between distally opposite first and second axial ends 90 and 92. Separator element 62 is radially between drain layer 72 and sidewall 82.

In the preferred embodiment, each of ends 88 and 92 of separator element 62 and drain layer 72, respectively, engages endwall 84. Separator element 62 is spaced radially inwardly of sidewall 82 by a first gap 94. Drain layer 72 is spaced radially inwardly of separator element 62 by a second gap 96. Endwall 84 extends across and radially beyond end 88 of separator element 62 and radially spans gap 94 to sidewall 82 and also radially spans gap 96 to drain layer 72. In the preferred embodiment, drain layer 72 is permanently mounted to the tank at the engagement of endwall 84 and end 92 of drain layer 72, and endwall 84 is a tank cover or end cap removably mounted to the tank. Endwall 84 has an opening 98 therethrough axially aligned with hollow interior 78. The clean separated air flows through opening 98 in endwall 84. End 88 of separator element 62 is an end cap engaging endwall 84 and which may be removably mounted thereto. Hollow interior 78 has an annular reservoir at 100 at end 90 of drain layer 72, collecting the separated coalesced oil.

It is recognized that various equivalents, alternatives and modifications are possible within the scope of the appended claims.

What is claimed is:

1. An air/oil separator tank comprising a separator element having coalescing media, said separator element being removable from said tank and having an upstream side receiving oil laden air and having a downstream side passing separated coalesced oil and air therefrom, and further comprising a drain layer permanently attached to said tank and downstream of said separator element and removing said separated coalesced oil and passing said air;

wherein said separator element is annular and extends axially along an axis, and has an inner perimeter defining a hollow interior, and has an outer perimeter defining an annular outer chamber, said drain layer being in said outer chamber; and wherein said tank has a sidewall extending axially between distally opposite first and second endwalls, said drain layer being spaced radially outwardly of said separator element, said sidewall being spaced radially outwardly of said drain layer; and wherein said drain layer extends axially in said outer chamber between said first and second endwalls, said drain layer having a first axial end at said first endwall, and a second axial end at said second end wall.

2. The air/oil separator tank according to claim 1 wherein said separator element extends axially between distally opposite first and second axial ends, said first endwall engages said first end of said drain layer and said first end of said separator element, said first endwall has an opening therethrough axially aligned with said hollow interior, said oil laden air flows through said opening in said first endwall axially into said hollow interior and then radially outwardly through said separator element, and said separator element is removably mounted to said tank at said engagement of said first endwall and said first end of said separator element.

3. The air/oil separator tank according to claim 2 wherein said drain layer is permanently mounted to said tank at said engagement of said first endwall and said first end of said drain layer.

4. The air/oil separator tank according to claim 2 wherein said second endwall engages said second end of said drain layer, and wherein said drain layer is permanently mounted to said tank at said engagement of said second endwall and said second end of said drain layer.

5. The air/oil separator tank according to claim 4 wherein said second endwall is axially spaced from said second end of said separator element.

6. The air/oil separator tank according to claim 2 wherein said outer chamber has an annular reservoir collecting said separated coalesced oil, said reservoir being along said first endwall between said drain layer and said sidewall.

7. An air/oil separator tank comprising a separator element having coalescing media, said separator element being removable from said tank and having an upstream side receiving oil laden air and having a downstream side passing separated coalesced oil and air therefrom, and further comprising a drain layer permanently attached to said tank and downstream of said separator element and removing said separated coalesced oil and passing said air;

wherein said separator element is annular and extends axially along an axis, and has an inner perimeter defining a hollow interior, and has an outer perimeter defining an annular outer chamber, and said drain layer is in said hollow interior; and wherein said tank has a sidewall extending axially from an endwall, said sidewall being spaced radially outwardly of said separator element, said separator element extends axially between distally opposite first and second axial ends, said drain layer extends axially between distally opposite first and second axial ends, said separator element is radially between said drain layer and said sidewall; and wherein each of said second ends of said separator element and said drain layer engages said endwall.

8. The air/oil separator tank according to claim 7 wherein said separator element is spaced radially inwardly of said sidewall by a first gap, said drain layer is spaced radially inwardly of said separator element by a second gap, said endwall extends across and radially beyond said second end of said separator element and radially spans said first gap to said sidewall and also radially spans said second gap to said drain layer.

9. The air/oil separator tank according to claim 8 wherein said drain layer is permanently mounted to said tank at said engagement of said endwall and said second end of said drain layer.

10. The air/oil separator tank according to claim 9 wherein said endwall is a tank cover having an opening therethrough axially, aligned with said hollow interior, said separated air flowing through said opening in said endwall.

11. The air/oil separator tank according to claim 7 wherein said hollow interior has a reservoir collecting said separated coalesced oil, said reservoir being at said first end of said drain layer.

* * * * *